Jan. 22, 1957 E. N. MULLER 2,778,871

ELECTRONIC SYSTEMS FOR LARGE-SCREEN COLOR TELEVISION

Filed June 28, 1951 2 Sheets-Sheet 1

Inventor
Egon Nicolas Muller

Jan. 22, 1957 E. N. MULLER 2,778,871

ELECTRONIC SYSTEMS FOR LARGE-SCREEN COLOR TELEVISION

Filed June 28, 1951 2 Sheets-Sheet 2

Inventor
Egon Nicolas Muller

United States Patent Office 2,778,871

Patented Jan. 22, 1957

2,778,871

ELECTRONIC SYSTEMS FOR LARGE-SCREEN COLOR TELEVISION

Egon Nicolas Muller, Esch/Alzette, Luxembourg; Nicolas Muller, legal representative of said Egon Nicolas Muller, deceased Application June 28, 1951, Serial No. 233,958

16 Claims. (Cl. 178—5.4)

This invention is concerned with the projection on a large viewing screen, of images in natural colors in accordance with incoming television signals; by the aid of all-electronic apparatus.

The dispositions known so far for this purpose suffer from insufficient luminosity, from loss of definition and moreover from color misregister due to various slight imperfections in the electronic and optical adjustments. They are not adapted for mass production and require one or several excessively large and expensive picture tubes and associated projection means for high resolving power; this apparatus is usually disposed in front of the viewing screen and usually requires a small projection throw thereby tending to interfere with proper viewing conditions by a marked obstructing effect.

The so-called scanning "aperture" effect in the picture tubes and slight blurring due to insufficient resolution of high-efficiency projectors usually cause substantial wasting of the band width required for signal transmission while slight color misregistration (which is practically unavoidable with the known reproducer arrangements and may occur in all directions) corresponds to an even more severe spoiling of bandwidth.

The broad object of the present invention is to overcome the various drawbacks just pointed out by producing the complete color picture as an assemblage of a plurality of projected rasters representing differently centered portions of the complete color picture and proceeding from an array of small cathode-ray tubes individually associated with optical projectors.

Plural projection systems including an array of cathode-ray tubes and optical projectors are set out in E. N. Muller's Luxembourg Patent No. 22,744, issued November 9, 1936, or British Patent No. 503,025, issued March 30, 1939, for producing large-screen pictures of high quality in black-and-white. Arrangements have been proposed in E. N. Muller's U. S. application Ser. No. 102,223, filed June 30, 1949, whereby to reproduce pictures in natural colors by the aid of a plurality of cathode-ray tubes individually building up monochrome areas of images in the primary colors the rasters being individually projected optically and combined in predetermined manner.

Arrangements in accordance with this invention just like those just mentioned, provide simple and efficient cathode-ray systems providing a practically unlimited amount of luminosity and securing very sharp definition of optimum color quality.

A more specific object of the present invention is to provide a plural projection system projecting areas of the picture in natural colors (or denoting overlying areas of image detail in respect of the primary colors) individually reproduced by a plurality of cathode-ray devices. This invention preferably uses cathode-ray tubes having composite targets to produce rasters in full color. Frequently, such a design is cheaper than the apparatus proposed in U. S. application S. N. 102,223 above referred to. In contradistinction to the latter, each raster traced out in the individual cathode-ray tubes, is in invariable spatial relationship with an array of effectively interspersed elements in respect of the different primary colors, of smaller dimension than a scanning element in at least one direction. The rasters traced out in respect of the primary colors are in registration condition and overlie effectively, either completely or in respect of an essential part. Systems according to this invention permit the use of electronic and optical elements highly adapted for mass production removing practically all causes of blurring in the picture tubes (such as, for example, due to poor spot focusing or to "aperture" effect or due to imperfections of poor overall resolution capability of the composite target structure used or due to imperfections of the color selection system or the like. Furthermore the invention eliminates or minimizes blurring and loss of resolution due to the use of a high-efficiency optical projection system and color fringes due to poor registration of the primary colors; furthermore the plural projection system being disposed behind the viewing screen may easily be made extremely "flat" and compact.

The invention preferably uses picture tubes having a composite target yielding phosphorescence in accordance with the incidence condition (in particular the incidence angle) of a single electronic pencil. Picture tubes using distinct pencils in respect of the primary colors, may alternatively be used.

The invention is suitable for a great variety of signal transmission schemes.

Specific features of the invention consist in providing efficient arrangements for feeding the color modulation; and simple and efficient color keying waveforms and dispositions. Further features are relative to the delimitation, overlap and fade-over of individual color picture portions or overlying rasters in different primary colors to ensure a perfectly homogeneous appearance of the complete color picture.

Another object of the invention is concerned with systems for automatically ensuring accurate raster adjustments. Further objects will become apparent from the detailed description. A typical embodiment of the invention and a few modifications are more particularly set out hereinafter by way of example.

In Figs. 1–5 of the accompanying drawing:

Figure 4:
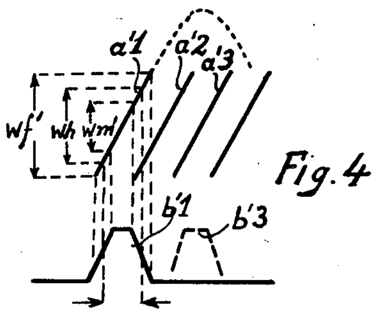
Figure 5:
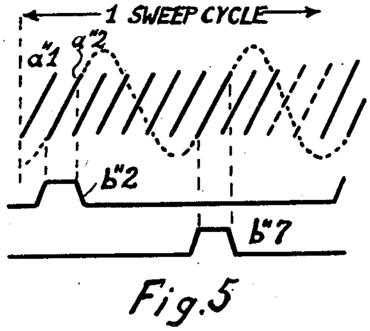
Figure 4A:
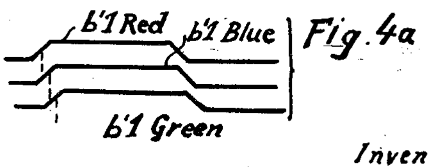

Figs. 4 and 4*a* illustrate deflection and keying waveforms providing an alternative mode of operation securing "fade-over" of picture areas; Fig. 5 illustrates a modification of the scanning and keying waveforms.

Figures 6, 7A:
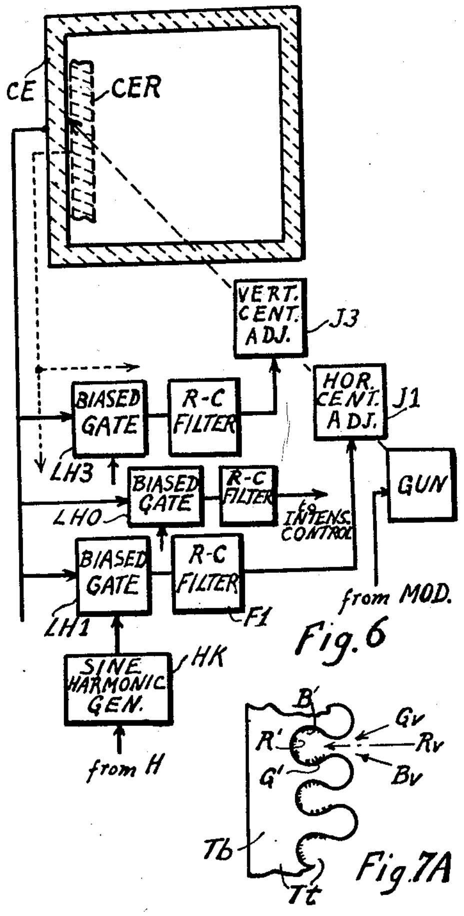
Figure 8:
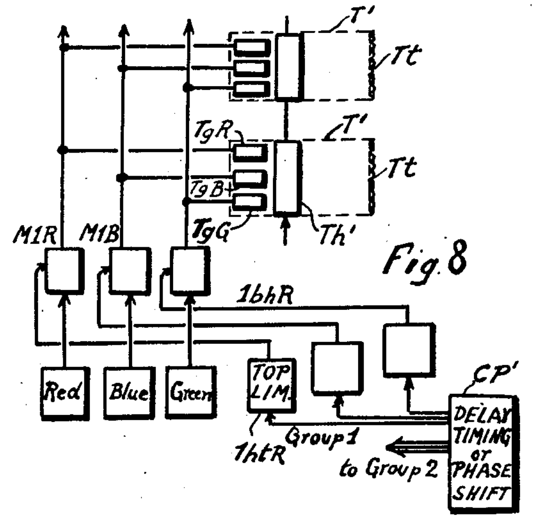
Figure 9:
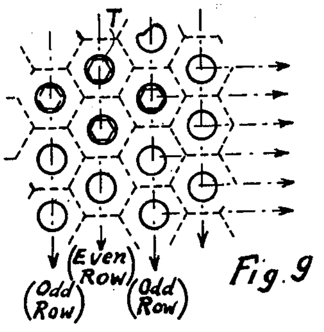

Fig. 6 illustrates automatic raster adjustment;

Fig. 7*a* shows a detail of cathode-ray tube;

Fig. 8 illustrates modifications of the electronic apparatus; Fig. 9 illustrates a preferred arrangement for delimiting pictures areas.

Figure 1:
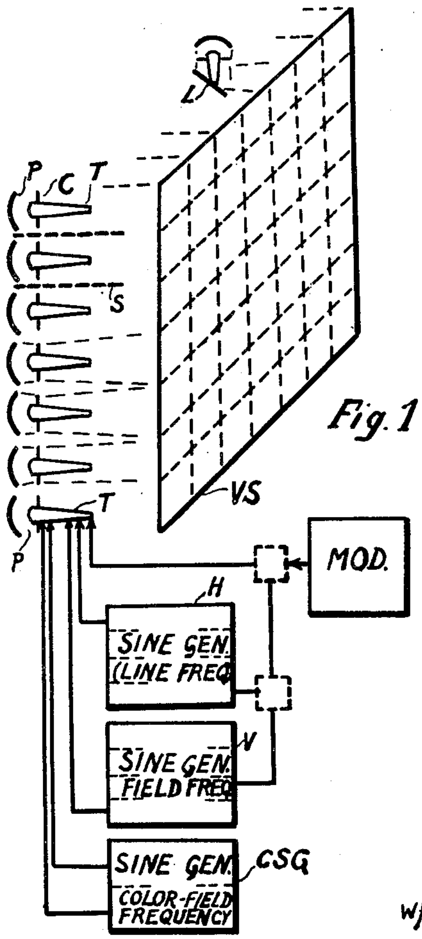
Figs. 1 and 7 show a typical embodiment of the invention.
Figure 7:
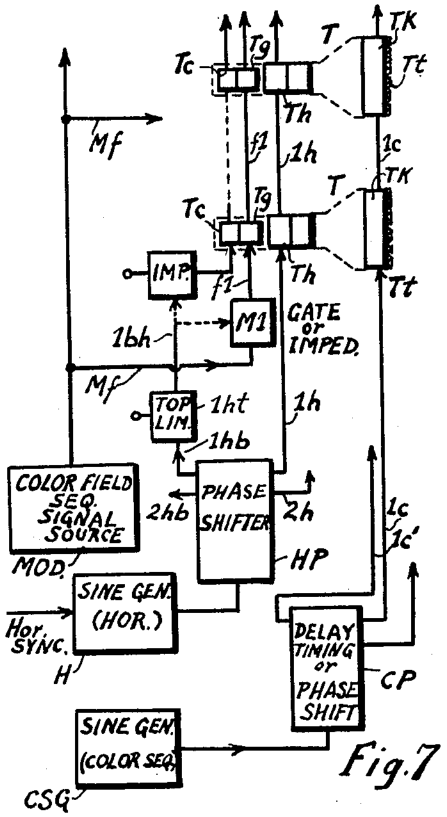

Reference should now be had to Fig. 1 and to Fig. 7 which shows the broad organization and details of electronic apparatus repectively, of a typical embodiment of plural projector for producing color television pictures on a very large viewing screen VS by the aid of an array of color picture tubes T. The tube rasters, of mosaic formation, are denoted at T*t* at Fig. 7 and individually reconstitute predetermined areas or portions in full color of the picture. Each raster is individually associated with a projector P of large optical aperture serving for very low optical resolution. Schmidt type projectors are used in the instance shown including spherical mirrors and correction elements C; if preferred projection lenses could be used. Projection is onto the rear of the viewing screen VS which is translucent (and may have directional properties). The general direction of individual projection paths may be substantially normal to the viewing screen so that keystone distortion effects may be avoided.

In the instance shown the picture tubes and projectors are arranged according to a regular pattern defining seven horizontal rows and seven vertical rows or columns (corresponding to the fast and slow scanning directions respectively). The resultant color picture is built up by 7×7=49 areas. If for example the complete picture has a definition of 420 scanning lines each picture tube may deal with about 60 scanning lines vertically and with similar definition in the horizontal direction. In the present instance the picture areas and rasters may be rectangular having the same aspect ratio as the complete picture.

In practice, the system is the more compact the higher the number of tube rows while the optical enlargement may be correspondingly decreased and likewise the length of individual projection throws or distance between the picture tube structure and viewing screen. The compactness (which should correspond to a minimum of apparatus depth behind the viewing screen) may be further improved by providing one or several individual reflectors for folding the individual projection paths as indicated at L.

The picture tubes are designed for very high beam current (several milliamperes say) and likewise very large spot size; (the spot may be overfine in the horizontal scanning direction), the gun voltage may be relatively moderate (40 kv. say). These tubes, just like the associated optical projection elements, may be quite small (having, for example, the size customary in cheap projection type receivers for home use), and may readily be manufactured on a mass production basis (having optics of molded plastics say) having particular regard to the very low required resolving power.

The overall light efficiency of the system including 49 tubes say, corresponds to the use of one extremely big tube having a 49-fold raster surface (of composite character) and a corresponding big optical projector having the same high optical aperture as individual projectors P but dealing with the full resolution (which of course would not be able to avoid a certain amount of quality degradation). Extremely high color registration precision is required for scanning spots in different colors which should be exact to within a fraction of one elemental area or scanning line. This in turn, with the said known disposition corresponds to about one-thousandth of the full raster width or height; however, with the disposition of Fig. 1 the requirements (as measured for example by the amplitudes of scanning or color control forces) are reduced to say a seven times lower relative value.

The embodiment illustrated by way of example in Figs. 1 and 7, is based on a color television transmission of the sequential type, wherein the color is changed at the end of each scanning field. The cathode-ray tubes T may be of the type including a single cathode-ray beam and a composite or mosaic target structure T*t* formed with interspersed elements being of different materials which when struck by the CR-beam yield fluorescence in correspondingly different primary colors. Color selection is in accordance with the characteristics of the ultimate portion of the trajectory of said beam in particular the angle of incidence or directioning relative to the surface of the composite target as defined by the color selecting modulation applied to color selecting means designated T*k* in Fig. 7. Said elements (in at least one direction in which said interspersal may occur) have dimensions less than the width of one scanning line or dimension of one scanning point. The brightness of the fluorescent spot is defined in accordance with the picture signals applied to gun means including main modulation electrode means designated T*g* in Fig. 7. The construction of these picture tubes per se does not form a part of this invention. The same (in particular the target and color selecting fields) may, for example, be constructed as set out in E. N. Muller's applications Ser. No. 102,223 above cited or Ser. No. 176,801 and may comprise a main color selecting field for "post deflection" as at T*k* traversed by the scanning cathode-ray beam just before the same strikes the target and a biasing "preliminary" deflection field (not shown) according to the selected color, in the vicinity of (or combined with) the scanning deflection means said two color-selecting fields comprising coil structures traversed by the same or by closely related currents. Typical color selecting waveforms will be considered a little later. A detail of a typical mosaic target structure T*t* is shown in Fig. 7*a*. The phosphor elements R′, G′, B′ for red, green and blue respectively may, for example, be deposited on a translucent glass plate formed with depressions or recesses according to a definite pattern and defining "walls." The latter prevent the electrons incident from directions G*v*, R*v* or B*v* respectively, from striking phosphor elements yielding improper colors; said walls preferably acting also in a certain measure as elemental reflector surfaces to improve the efficiency and regularize the luminescence distribution.

The incoming color television signals may simultaneously be applied, over leads M*f* --, to the modulation electrodes T*g* of all the picture tubes by the aid of the receiver device MOD of well-known character. Optionally groups of picture tubes are fed through the intermediary of amplifiers M1 -- serving for keying purposes as will be apparent a little later.

The electron beam may be swept over the associated composite target T*t* substantially at a uniform predetermined rate irrespective of the selected color; the beam trajectory being bent differently during successive scansions of T*t* -- by the aid of the color selecting fields T*k* -- as considered a little later. It will also be assumed that the phosphor elements are grouped as dots in the primary colors in such a manner as to define minute circles or areas or interlocking hexagons each including a red, blue and green dot. (According to a typical embodiment there might be about one-hundred such phosphor groups in either scanning direction.)

The horizontal sweep generator (for causing deflection across individual targets in the direction of the raster lines) will be considered first. Same may comprise a (master) sine wave generator H of line frequency (as defined, for example, by the incoming line synchronization pulses) associated with phase shift means as at HP and if desired individual amplifiers or followers. If preferred, there may be provided a plurality of distinct oscillators kept in synchronism and correct phase relationship by associated circuits of known character linked with a master generator. In the above numerical instance eight sine wave phases of echelon phase shift values corresponding to ⅛ cycle may be used; each may control the horizontal deflection means of all the picture tubes of the appropriate one of the eight corresponding vertical rows of tubes over leads 1*h*, 2*h* --; a "flyback" as usually occurs after the scanning of a complete picture at the transmitter and may be looked upon as corresponding to the time period required for scanning a hypothetical eighth row of tubes.

If scanning coils are used four sets of sine waves of course are adequate taking into account proper sense of connection thereof.

Figure 2:
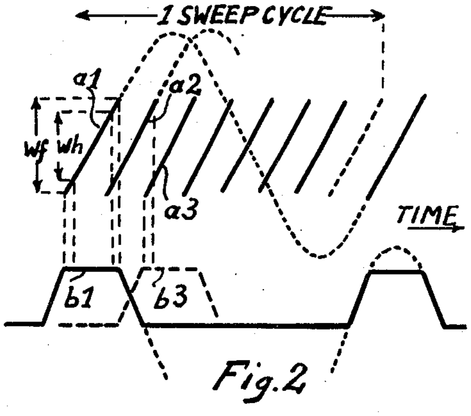
Fig. 2 illustrates typical deflection and keying waveforms used in Figs. 1 and 7.

In the top portion of Fig. 2 the "useful" portions of these sine waves are indicated by the full lines as at *a*1, *a*2, *a*3 --; same corresponds to a substantially rectilinear portion of the rising portion of sine waveform. One of the sine waveforms (corresponding to *a*1) is shown more particularly (in dotted lines). The downward waveform portion tends to produce ambiguity of deflection of the cathode-ray beams and to avoid same, the beams associated with the different sine waves in the present arrangement are individually suppressed or blacked out by means of blocking waveforms of which are few are shown viz. $b1$, $b3$, in the bottom portion of Fig. 2 (being denoted by similar reference numerals as the associated main waveforms).

A shown these blocking waveforms have a substantially flat top portion and sloping side portions. They may, for example, be produced by the aid of sine waveforms presenting a phase shift of approximately 90° with respect to the associated deflection waveforms being derived over leads 1*hb*, 2*hb* -- from a common set of generators by the aid, for example, of a limiting diode and upper limit voltage as at 1*ht* -- feeding leads 1*bh*. Optionally there may be provided a similar distinct lower limiting disposition of well-known character (or individual amplifier means operated as in accordance with circuit arrangements known in the art as "slicers"). These waveforms are largely non-critical. These blocking waveforms could be applied to distinct modulation means of the picture tubes or, as indicated schematically in Fig. 1, they may be injected into the circuit of the main modulation electrode of the picture tubes, for instance by the aid of a transformer coil or other impedance as indicated at M1 --. The cathode-circuits of the proper rows of tubes if desired could be controlled in this manner as indicated schematically at Tc—M1 --.

The operative steady bias of the associated rows of picture tubes may accordingly change over from an excess bias value to a value permitting normal tube operation viz. when the tops of the blocking waveforms occur. The adjustments may be such that said waveform tops permitting tube energization last for a longer time than the scanning through the "theoretical" width of one area i. e. one-eighth of a picture-line; as indicated in Fig. 2; at instants of time corresponding to the scanning through one-half of the adjacent areas the mean intensity of the cathode-ray spots or effective amplitude of the blocking waveform may be of the order of one-half of the full or normal value (corresponding to the tops of said waveforms). In this manner the drain of beam current of the picture tubes at any time may be approximately equivalent to the drain of two rows of tubes; if both horizontal and vertical rows are controlled in such a manner the total drain at any time may be due to four fully operative picture tubes, at any time.

The sine wave phases and the deflection amplitude may be appropriately adjusted or preferably there are provided auxiliary centering and deflection amplitude adjusting means of well-known character (such as, for example, auxiliary electromagnets traversed by adjustable D. C.-currents optionally also by slight adjustable currents of deflection waveforms) to ensure ultimate accuracy of the rasters.

The scanning amplitude *wh* corresponding to the "theoretical" width of areas in the above numerical example may correspond to say 60 scanning lines or points; the actual sweep width *wf* (corresponding to a more or less visible spot on the viewing screen deflected linearly and having full intensity on the raster) may, for example, correspond to 65 scanning lines or points so that there is formed an "overlap" region of 10 units on the viewing screen over which fade-over is secured.

Figure 3:
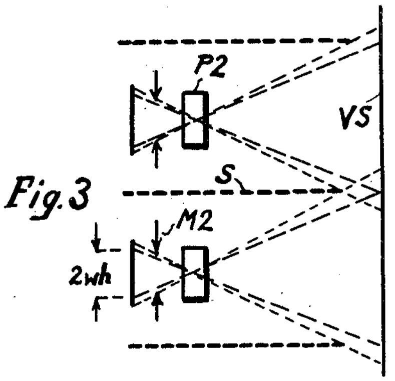
Fig. 3 illustrates a typical mode of operation securing "fade-over" of adjacent picture-areas in the complete picture.

As shown more particularly in Fig. 3 this fade-over may be by the aid of masks or diaphragms M2 positioned slightly out of the plane of focus of the associated optical projection means P2 and defining openings corresponding to the "theoretical" area widths 2*wh* (which latter tend to ensure exact contiguity on the viewing screen VS). Shields S are fitted to keep the projection paths substantially distinct. A similar fade-over result could be achieved by accurately positioning said shields S in the vicinity of the viewing screen.

The vertical deflection generator may be substantially similar to the horizontal one and adapted to produce a set of sine waves of field frequency in conjunction with a corresponding set of blocking waveforms. The latter may be injected in the modulation circuits of the proper horizontal rows of picture tubes.

The sense of connection of the horizontal and vertical deflection coils (or plates) is such as to individually invert the pictorial content of the rasters with respect to the corresponding projected areas of the picture as a whole.

The color selection generator CSG as shown comprises a sine wave generator of color field frequency supplying or controlling sine waveforms of different phase values, e. g. by the aid of delay means as at CP (Fig. 7). Two sine waveforms in phase quadrature (or three phases) may, for example, be supplied to the picture tubes having two (or three) effective color selecting coils (coil-pairs) disposed around over leads 1*c*, 1*c'* --. These color selecting phases may for example be fed separately to different rows of tubes over leads 1*c* (1*c'*), 2*c* --, with echelon phase shift values so that the total shift for the top and bottom rows corresponds to 120°. The associated targets may all be oriented in the same manner. If preferred the same sine wave phases may simultaneously be fed to all the picture tubes the said color selecting coils being oriented differently with respect to the associated targets.

Spot-wobbling means of known character may be provided for slightly spreading the spots in the vertical direction (being for example fed with wobble currents through amplifiers keyed line-wise by the waveforms in the bottom portion of Fig. 2).

The operation of the system is as follows: Suppose that signals denoting a red field are about to be transmitted. A spot will trace the red raster in the first picture tube (in the upper left corner of the cathode-ray structure); just before same is reaching the boundary or end of the raster while apparently completing the scanning of the first line portion or division another spot starts the scanning of a red raster in the adjacent tube of the same horizontal row. For a brief while images of these two spots are substantially exactly superposed on the viewing screen with reduced brilliancy (due to the mask M2 in Fig. 3). The second spot progressively attains full brilliancy whilst the first one fades. In similar manner several scanning lines in red are exactly superposed on the viewing screen a little later to provide a fade-over zone as the rasters of one row of tubes are completed and the next horizontal row begins to be scanned. [As the scanning of the picture progresses the orientation, inclination or angle of incidence of the CR-beams in space (i. e., with respect to a fixed reference system of coordinates) may tend to change (since the color-selecting fields may apparently rotate); however, in each particular tube (or group of tubes), the proper inclination with respect to the target structure prevails owing to the above phase shift or relative change of orientation of the color selecting means and target means.]

When the scanning of the last raster building up the red field is completed the CR-beam in the first tube becomes again visible but relative change of orientation between beam and target through about 120° is now effective (due to the above change of coil orientation or due to the difference of coil-selecting phases) so that a blue field is built up followed in turn by a green one.

Although the incidence angle of the pencil with respect to the associated target structure tends to change slightly with the above disposition during the scanning of individual picture tubes (by about 1/24 of a full revolution in the numerical example above given) this inconvenience is unimportant since causing but slight color change being the less pronounced the higher the number of rows of tubes. This inconvenience may be fully avoided by using target structures (the same for all the tubes) wherein the orientation of groups of phosphor elements varies slightly over the target area in particular from top to bottom with field-sequential transmissions (with line-sequential transmissions) the disposition being of similar character to the one set out in application Ser. No. 176,801 above cited. Alternatively a second harmonic waveform of low amplitude might be superposed to the main color selecting waveform (applied to the same or to auxiliary coils) for example in phase quadrature in such a manner as to tend to cause rotation of the pencil in the opposite direction.

By cutting off the color selection means (and possibly altering the frequency of the horizontal and vertical deflection sets) the picture structure may be permitted reproduce transmissions in black-and-white when using the type of composite target above set out. The whole picture structure might be mounted on rollers to permit physical motion toward or away from a theater scene.

According to a modification of the sweep and beam keying means the mask means M2 (or critical design of shields S) in Fig. 2 may be dispensed with individual rasters having critical dimensions and predetermined marginal characteristics defined by scanning the field embraced by each optical projector may be wide enough to include some pictorial detail around the "theoretical" limits of individual rasters (corresponding to exactly contiguous projected areas). Sine waveforms generally as in Fig. 2 may basically provide the deflection. As shown more particularly in the bottom portion of Fig. 4 the spot intensity control waveforms or keying waveforms may progressively reduce the spot intensity as the spot moves toward and beyond the said "theoretical" raster limits to ensure a certain "overlap" and vignetting effect.

One of the beam control waveforms viz. *b'*1 is indicated more particularly, with respect to the associated sine waveform *a'*1 of which the portion *wh* corresponds to said "theoretical" raster width whereat the spot brilliance may be one-half of the normal value; the portions *wm'wf'* correspond respectively to the raster width of full spot brilliance (corresponding to the flat top of *b'*1) and to the extreme limits of the vignetted raster. The total beam current drain at any time thus becomes equivalent to the current drain of one row of tubes or, if both horizontal and vertical rows are controlled in this manner becomes equivalent to that of a single picture tube operated normally. The circuit disposition, generally speaking is as set out above, with reference to element M1 -- (Fig. 7). The adjustments are particularly easy if a distinct modulation electrode is provided for this auxiliary intensity control of the beam or if gain control means are associated with individual amplifier means for the signal modulation. Acceptable results may however be attained by superposing voltages *b'*1 to the signal modulation; moreover markedly non-linear characteristic curves of the modulation electrode could be taken into account by compensating distortion of curves *b'*1 --.

I may prefer slightly staggering or shift in time the control waveforms *b'*1 -- for the different primary colors as indicated in Fig. 4*a* at *b'*1 Red, *b'*1 Blue, B'1 Green respectively (without correspondingly altering the deflection sine waveforms which latter tend to scan sufficiently wide rasters). Fig. 8 shows, by way of example, such a modification. In lieu of the single circuit element M1 in Fig. 7 selectively passing video signals to a row of tubes under the control of the waveform applied over lead 1*bh*, there are presently used for each row of tubes three circuit elements M1R, M1B, M1G passing signals of the proper color from gates or sources designated Red, Green, Blue under the control of a respective waveform applied over leads 1*bh*R -- in the form of a limited sine wave of proper delay or phase by elements 1*ht*R—CP' closely similar to the elements 1*ht*, CP in Fig. 7. The tube elements shown will be considered further a little later. By, for example, applying these control waveforms through the intermediary of blockable amplifiers or gates controlled (opened) in accordance with the selected color the superposed rasters in different colors may be differently delimited and hence also the fade-over patterns whereby optimum texture of the picture in full color may be ensured.

Fig. 5 illustrates a modification wherein eight rows of picture tubes are provided while "flyback" may correspond to two extra (hypothetical) rows deflection being by the aid of sine waveforms *a''*1, *a''*2 -- of twice the line (or field) frequency whereby the peak-to-peak amplitude is not much higher than the "useful" waveform portion. The corresponding blocking waveforms may be as set out with reference to Figs. 2 or 4; those relative to tube rows 2 and 7 are denoted at *b''*2 and *b''*7 respectively are associated with the same sine waveform *a''*2.

According to another modification the sweep deflection waveforms for either or both scanning directions may be such that flyback occurs simultaneously in all the tubes during the flyback interval at the transmitter. This obtains for example, by a set of slightly overlapping "slices" of a sawtooth waveform of conventional type (by the aid of upper and lower limit means such as diodes, echelon biasing voltages and of amplifier means say) or if preferred by a sawtooth wave in conjunction with appropriate biasing voltages and with sine waveforms generally similar to those in Fig. 2; modulation keying thus may be dispensed with. These modifications are believed to be sufficiently easily understood without illustration.

According to a further modification illustrated in Fig. 9 the picture may be built up of interlocking hexagons, the projected rasters from tubes T -- being projected normally as pointed out hereinbefore and delimited hexagonally by the aid of masks as in Fig. 2. Said rasters are being produced, for example, by the aid of sine waves (and keying voltages) in respect of coordinate directions in a manner such that rows of tubes in one direction are associated with sine wave phases corresponding to relatively large phase shift values and the phase values relative to alternate rows in the transverse direction are staggered.

In lieu of color field sequences other sequences may be used: the frequency of generator CSG would be appropriately altered.

Modified composite target structures may be used wherein for example elements yielding different primary colors are disposed along sub-elemental lines; in this case it is preferred to energize groups of tubes with substantially the same color selecting pulses or waveforms, broadly in sawtooth manner with very low harmonic content (the third harmonic only); with field-sequential transmissions said sub-elemental lines might for instance be horizontally and horizontal rows of tubes could be energized in the scanning order. Contradistinct to the simultaneous control of all tubes by the same rectangular or step pulses of field duration there is thus a substantial saving of energy. The system might employ picture tubes of a type known per se wherein the cathode-ray trajectory ultimately is attracted toward or repelled from mesh type target surfaces yielding different colors and disposed in slightly different planes; three sets of regularly phase-displaced color selecting sine waves, as above set out, might be applied to said mesh targets for keying purposes.

The arrangement may furthermore be such, in particular with very fast color rates that keying of the modulation is both in accordance with groups of tubes (along horizontal and vertical rows say) and in accordance with the instantaneous color to be selected (as, for example, superposing control waveforms in the circuits of the normal modulation electrodes of the CR-tubes or to separate control electrodes or using groupwise associated blockable amplifier means).

The invention may be employed in conjunction with types of CR-tubes known per se represented schematically at T', having more than one gun these guns individually serving for the primary colors. As indicated schematically at T*h'* their beams are deflected in unison as, for example, by the sine waveforms as set out above. All the guns T*g*R, T*g*B, T*g*G -- may be keyed being groupwise (row-wise). Optionally, as shown keying may be in staggered manner as set out above with reference to Fig. 4*a*. (Generally speaking diverse auxiliary tube control elements similarly could be keyed groupwise or fed by sine waveforms thereby effectively to prevent energization when the corresponding spots are not visible.)

If very high picture quality is essential recourse may be had with advantage to devices for automatic control of raster positioning and/or size as proposed in E. N. Muller's French Patent No. 847,040 issued June 19, 1939, or U. S. application Ser. No. 243,759, filed December 3, 1938 (now U. S. Patent No. 2,630,548 issued March 3, 1953), by critically controlling the spot incidence with respect to a predetermined margin (or margins) wherein a correction potential (or potentials) may be derived by the aid of a marginal electrode or electrodes in response to the intermittent impact which in a negative feedback circuit may be applied to minimize said impact. An adjusting device of like character is illustrated in Fig. 6, serving to secure predetermined location of the scanning electron beam at predetermined instants of time. It will be sufficient to consider the adjusting device pertaining to a single cathode-ray tube since the different tubes operate in closely similar manner. Each of the CR-tube structures may, for example, be provided with two close-by auxiliary target electrodes along a margin as at CEL, CER. Currents due to electron incidence may be derived therefrom through gates such as LH1 selectively energized at predetermined instants of time (defined for example as a HK by harmonics of a basic sine scanning waveform, in either direction); said gates may be associated with hold-on means such as resistance-condenser filters as at F1 to supply the control voltages or currents. The control currents caused by the two electrodes mentioned, being utilized differentially i. e. in push-pull manner. The gate opening may be quite brief (as by appropriate biasing adjustment while applying said harmonic control waves). Accordingly as the spot is incident too early or too late it will predominantly provide correcting deflection through one electrode and gate or other, whereas if incident at the correct time it will yield control currents compensating each other. In lieu of a push-pull circuit single control electrode could be used in conjunction with predetermined biasing of the resultant control current, the gate tending to be opened when the border is struck. An electrode structure at CEL might surround the raster in diverse directions the corresponding control currents being derived through a plurality of gates as at LH1, LH3 (or gate pairs) opened at different instants of time according to the scanning in different directions. The beam while striking said electrode structure may have a predetermined amplitude (as by cutting off condenser-coupled modulation or keying over to a predetermined CR-tube biasing condition simultaneously with gate control). The gates may control centering (horizontally as at J1, J3 and vertically as at J1, J2) and also raster width (deflection amplitude as at J3); one of the gates as at IO moreover could serve for automatic intensity control of the associated beam by means of well-known character, tending to keep same at a predetermined value through the intermediary of means of well-known character, as at JO.

In the statement of claims hereinafter the reference to mosaic target means is intended to mean or include, built-up or composite target structures comprising interspersed elements in dot or line formation or the like on a plain or intricate surface or also on distinct closely spaced surfaces. The reference to "a portion of the complete color picture" is intended to include arrangements wherein portions of images in each of the primary colors jointly synthetizing said color picture, overlap rather than overlie individually and completely.

I claim:

1. In a television system for reproducing pictures in additive primary colors from video signals denoting elemental picture detail representative of a predetermined number of primary colors in accordance with a predetermined scheme, an array of cathode-ray tubes having means for defining electron beams and mosaic target means adapted to fluoresce upon electron beam impact in each of said primary colors to provide rasters based upon additive color synthesis, means for scanning said beams across the associated target means in predetermined relationship to said video scheme and concurrently modulating said beams under the control of said video signals whereby each tube reproduces a color raster which substantially represents one of N portions of the complete color picture being generally similar to, but slightly larger than, the respective portion, said N portions jointly representing the complete picture, optical means whereby individually to project and locate an image of the respective rasters on a projection screen to reconstitute a substantially complete color picture wherein adjacent portions overlap, and means for reducing the brilliancy of marginal areas of individual rasters whereby to compensate increased brilliancy due to said overlap.

2. A system according to claim 1 wherein said means for reducing the brilliancy comprise individual mask means in association with the optical projection means and paths for the respective rasters.

3. A television system for reproducing large-sized color pictures comprising means for deriving video signals denoting elemental picture detail in color in accordance with a predetermined scheme, an array of N cathode-ray tubes having mosaic target structures and fed with video signals and having scanning means in conjunction with scanning waveform generating means operative in coordinate directions scanning being correlated to said scheme whereby to convert said signals in individual tubes into composite rasters effectively in full color oriented in predetermined manner; means correlated to said scanning waveforms to control the time periods during which said video signals effectively determine operative raster production, each tube raster representing a substantially undistorted and different portion of the complete color picture representing more than 1/Nth area-amount of the picture-detail of the complete color picture whereby adjacent tubes effectively define overlap of picture detail, means for limiting the light-intensity of said overlap detail in predetermined manner, and means for optically projecting individually said composite color rasters for locating neighboring ones in predetermined registry condition said projected color picture portions building up a complete and substantially homogeneous color picture.

4. A television system for reproducing large-sized color pictures comprising means for deriving video signals denoting elemental picture detail in color in accordance with a predetermined scheme, a plurality of cathode-ray tubes respectively having means for developing one electron beam and having a composite target structure and fed with said video signals and provided with scanning means correlated to said scheme, whereby to convert said signals in individual tubes into composite rasters effectively in full color, means for determining accurate location and limiting of area detail of the individual rasters, each raster substantially representing an undistorted and different portion of the complete color picture oriented in predetermined manner and said means including electrode means responsive to beam impact disposed close to at least one boundary of target structure for deriving control potentials responsive to misregistry of the raster traced out by the respective beam, means for selectively transferring said potentials at predetermined instants of time and means responsive to said transferred potentials for determining registry correction; and means for optically projecting individually said composite color rasters substantially in juxtaposition to build up a complete and substantially homogeneous color picture.

5. A television system for reproducing large-sized color pictures comprising means for deriving video signals denoting elemental picture detail in color in accordance with a predetermined scheme, a plurality of cathode-ray tubes respectively having means for developing an electron beam and having a composite target structure and fed with said video signals and provided with scanning means correlated to said scheme whereby to convert said signals in individual tubes into composite rasters effectively in full color, means for determining accurate location and limiting of area detail of the individual rasters, each raster substantially respresenting an undistorted and different portion of the complete color picture oriented in predetermined manner and said means including an electrode structure for said target structure positioned in predetermined manner at the periphery of the raster, means for repeatedly deriving potentials from said electrode structure in accordance with repeated beam incidence during each complete scanning of the raster and responsive to misregistry between raster and electrode, structure and distributer means for selectively transferring said potentials at predetermined instants of time comprising the individual instants of occurrence of said beam incidence and means responsive to said transferred potentials for determining registry correction; and means for optically projecting individually said composite color rasters substantially in juxtaposition to build up a complete and substantially homogeneous color picture.

6. A system as defined in claim 5 further characterized by the provision of means responsive to potentials transferred through said distributor means as aforesaid for automatically adjusting the intensity of individual electron beams to improve the homogeneous appearance of the built up color picture.

7. A television reproducer for producing large-screen color pictures from color modulation signals, having an array of units adapted for individually producing scanning patterns effectively in full color, said individual units including electron beam controlling means and sweep deflector means, deflection waveform means for determining operative scanning of the pattern of the respective units with shift in timing substantially in accordance with the location in the array in coordinate scanning directions and with a relatively high waveform slope; means interconnecting the controlling means of individual units whereby to feed color modulation signals at least during periods of time corresponding to said operative scanning; and optical projection means for assembling said scanning patterns into a substantially homogeneous complete picture pattern.

8. A television reproducer system for large-screen color pictures having in combination, an array of cathode ray tubes individually provided with means including an assemblage of interspersed elements responsive to the primary colors for effectively producing a scanning pattern in full color, electron beam generating means, controlling means, sweep deflector means and electron target means whereby to sweep out a composite raster in invariable spatial relationship with said assemblage and derive light through the agency of the selected color elements in accordance with color modulation signals; deflection waveform means in respect of coordinate scanning directions for feeding the sweep deflector means whereby to determine scanning across said patterns with sufficiently high waveform slope and with a shift in timing substantially in accordance with the tube location in the array in the respective direction, said patterns reproducing differently centered area-fractions of the complete color picture; means interconnecting in respect of the different tubes corresponding elements controlling color modulation whereby to feed color modulation signals; means effectively delimiting the color patterns in predetermined manner; and an array of optical projection means individually associated with said tubes whereby to locate the respective projected rasters of neighboring tubes in predetermined registry condition the resultant assemblage of picture fractions representing a substantially homogeneous complete picture.

9. A television reproducer for large-screen color pictures comprising an array of cathode ray tubes including electron beam generating means, brightness control means, color selector means, sweep deflector means in respect of coordinate scanning directions and target means of mosaic character for producing rasters in full color, deflection waveform means in respect of said scanning directions for said sweep deflector means for determining scanning across said target means with a shift in timing substantially in accordance with the tube location within the array in the respective scanning direction; means interconnecting respectively the brightness control means and the color selector means of the said tubes whereby to apply color modulation signals; means for delimiting said rasters in predetermined manner; and an array of optical projection means individually associated with said tubes for combining the projected rasters so that neighboring rasters occur in predetermined registry condition.

10. A television reproducer for large-screen color pictures based on additive primary color synthesis comprising, an array of cathode-ray tubes individually fitted with means for producing and substantially separately modulating electron beams for each of the primary colors, sweep deflector means for said beams in respect of coordinate scanning directions and target means for mosaic character producing substantially overlying rasters in the primary colors, deflection waveform means in respect of said scanning directions for the sweep deflector means of the said tubes for determining scanning across said target means with a shift in timing substantially in accordance with the tube location in the array in the respective direction; means interconnecting the modulating means of the said tubes in respect of individual modulating means for the primary colors whereby to apply the respective modulation signals; means for delimiting the rasters of said tubes in predetermined manner; and an array of optical projection means individually associated with said tubes for combining the projected rasters in such a manner that neighboring rasters occur in predetermined registry condition.

11. A television reproducer system for larger-screen color pictures having in combination, an array of cathode-ray tubes located substantially along rows in coordinate directions, the individual tubes having means for effectively producing a raster in full color including target means of mosaic character, electron beam controlling means to be fed with color modulation signals and deflector means for sweeping the target means in scanning directions oriented along said coordinate directions; deflection waveform means in respect of the coordinate directions for said sweep deflector means to determine time-displaced sweeping across the target means of the respective tubes substantially in accordance with the tube location in the array; means for feeding said beam controlling means with color modulation signals and means correlated with said deflection waveform means whereby to limit the effective beam production in respect of each direction to row-groups of tubes to permit time-displaced useful scanning; means for effectively delimiting the rasters of said tubes in predetermined manner; and an array of optical projection means individually associated with said tubes whereby to locate the respective projected rasters of neighboring tubes in predetermined registry condition.

12. A television reproducer system for large-screen color pictures having in combination, an array of cathode-ray tubes individually having means for producing a raster in full color including target means of mosaic character, electron beam controlling means to be fed with color modulation signals and deflector means for sweeping the target in coordinate scanning directions; means for feeding said beam controlling means with color modulation signals; deflection waveform means for feeding the sweep deflector means with a shift in timing substantially in accordance with the tube location in the array and with a comparatively high operative sweep amplitude; concurrent means for effectively delimiting individual rasters in predetermined manner and in such a manner that usefully delimited raster production occurs in overlapping periods of time in respect of adjacent tubes in at least one scanning direction; and an array of optical projection means individually associated with said tubes whereby to locate the respective projected rasters of neighboring tubes in predetermined registry condition for building up a substantially complete and homogeneous color picture.

13. A television reproducer system for large-screen color pictures having in combination, an array of cathode-ray tubes located substantially along rows in coordinate directions, the individual tubes having means for effectively producing a raster in full color including target means of mosaic character, electron beam controlling means to be fed with color modulation signals and deflector means for sweeping the target in scanning directions oriented along said coordinate directions; deflection waveform means in respect of the coordinate directions for said sweep deflector means to determine scanning across said target means with a shift in timing substantially in accordance with the tube location in the array; means for feeding said beam controlling means with color modulation signals and means correlated with said deflection waveform means in at least one scanning direction whereby to determine a predetermined condition of raster production and delimitation in said direction in a group of tubes substantially comprising a row of tubes in said direction; and means for individually projecting the thus delimited rasters and locating them in predetermined registry condition in respect of neighboring tubes.

14. In a television system for reproducing large-screen color pictures based on additive primary colors, an array of cathode-ray tubes located substantially along rows in coordinate directions, the individual tubes having means for effectively superimposing rasters in the primary colors including target means of mosaic character, electron beam controlling means to be fed with color modulation signals and deflector means for sweeping the target in scanning directions oriented along said coordinate directions; deflection waveform means in respect of the coordinate directions for said sweep deflector means to determine scanning across said target means with a shift in timing substantially in accordance with the tube location in the array; means for feeding the beam controlling means of the tubes with color modulation signals and means correlated with said deflection waveform means in at least one scanning direction whereby to determine a predetermined condition of raster production and delimitation in said direction in respect of each of said primary colors in a group of tubes substantially comprising a row of tubes in said direction; and means for individually projecting the thus individually delimited superimposed rasters of the individual tubes and locating them in predetermined registry condition in respect of neighboring tubes for building up a substantially complete and homogeneous color picture.

15. A television reproducer system for large-screen color pictures having in combination, an array of cathode-ray tubes located according to alternate staggered rows, the individual tubes having means for producing a raster in full color including target means of mosaic character, electron beam controlling means to be fed with color modulation signals and deflector means for sweeping the target in coordinate scanning directions; deflection waveform means for feeding the sweep deflector means with a shift in timing substantially in accordance with the tube location in the array the timing being staggered in respect of the tubes of alternate rows; means for feeding color modulation signals to said tubes; mask means effectively delimiting individual rasters in predetermined manner according to a hexagonal pattern; and an array of optical projection means individually associated with said tubes for substantially normally projecting individual rasters to determine interlock of neighboring projected hexagonal patterns for building up a substantially homogeneous complete color picture.

16. In a television system based on a sequence of signals in primary colors at a rate corresponding to the scanning through a picture coordinate dimension, a reproducer having an array of cathode-ray tubes located according to rows in coordinate directions, said tubes including brightness control means, color selector means, sweep deflector means in respect of coordinate scanning directions corresponding to said directions and target means of mosaic character for producing rasters in full color, deflection waveform means in respect of said scanning directions for said sweep deflector means for determining scanning across said target means with a shift in timing substantially in accordance with the tube location within the array in the respective scanning direction; means for applying brightness signals to row-groups of said tubes; means for applying to said color selection means color selection waveforms time-displaced substantially in accordance with the tube location in the array and of color selection periodicity and having no or small harmonic content; means for delimiting said rasters in predetermined manner; and an array of optical projection means individually associated with said tubes for combining the projected rasters so that neighboring rasters occur in predetermined registry condition.

References Cited in the file of this patent

UNITED STATES PATENTS

| | | |
|---|---|---|
| 2,389,646 | Sleeper | Nov. 27, 1945 |
| 2,481,839 | Goldsmith | Sept. 13, 1949 |
| 2,532,511 | Okolicsanyi | Dec. 5, 1950 |
| 2,560,168 | Goldsmith | July 10, 1951 |
| 2,568,543 | Goldsmith | Sept. 18, 1951 |
| 2,586,558 | Oakhill | Feb. 19, 1952 |
| 2,607,845 | Clark | Aug. 19, 1952 |